W. J. METZGER.
CAR COUPLING.
APPLICATION FILED MAY 4, 1918.
1,363,479.
Patented Dec. 28, 1920.
2 SHEETS—SHEET 1.
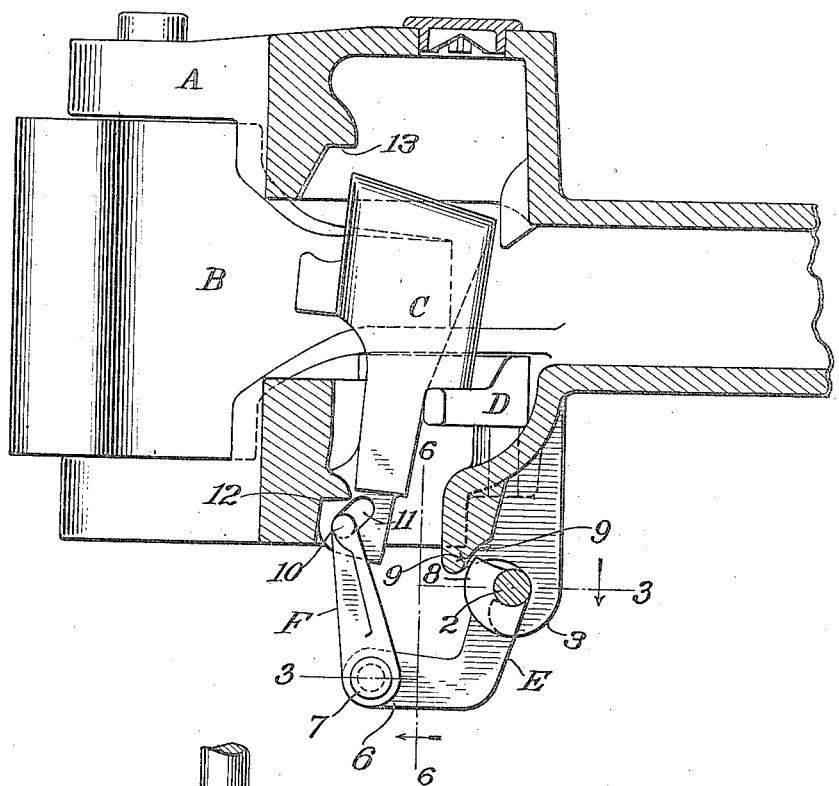
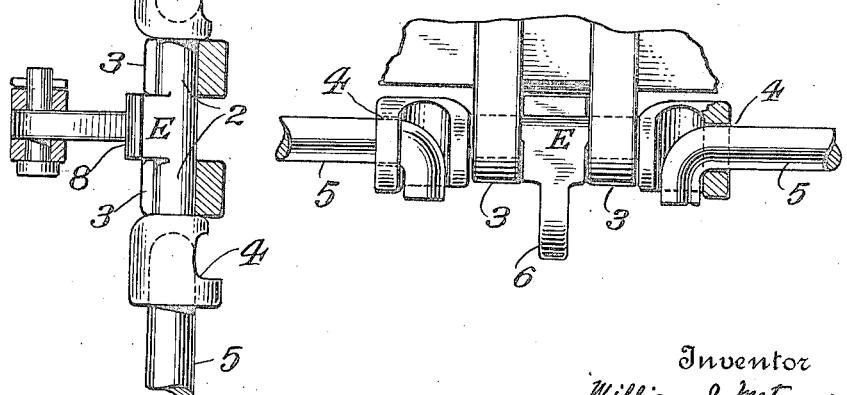
Inventor
William J. Metzger
By his Attorney
Clarence D Kerr

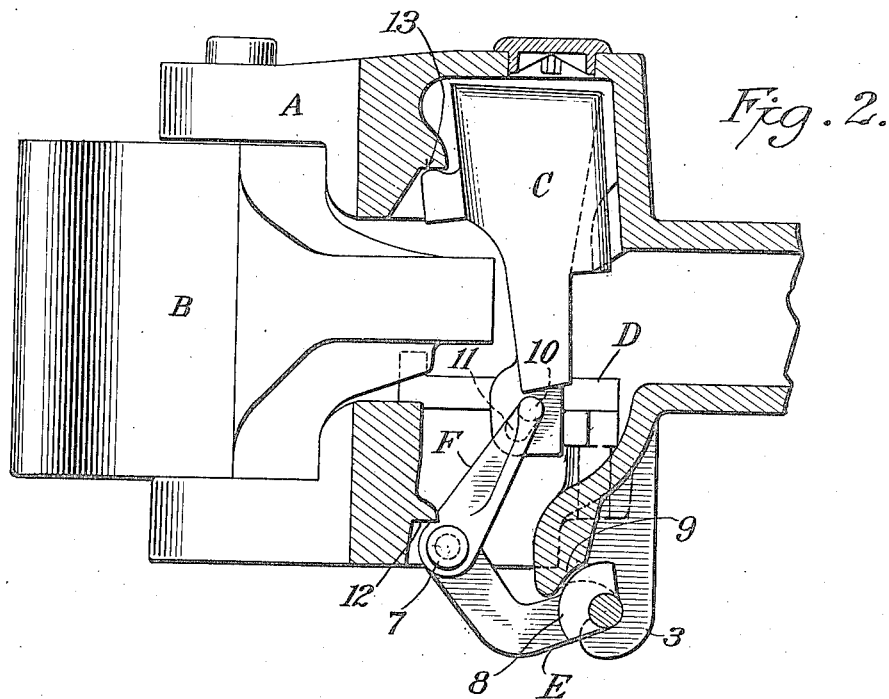
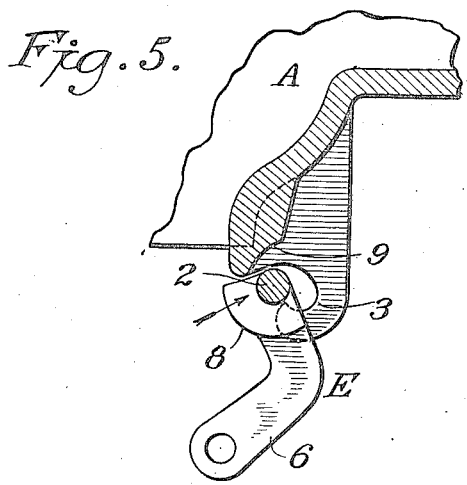
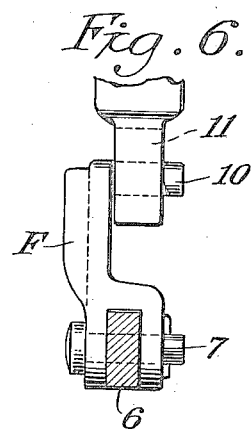

UNITED STATES PATENT OFFICE.

WILLIAM J. METZGER, OF CLEVELAND, OHIO, ASSIGNOR TO THE NATIONAL MALLEABLE CASTINGS COMPANY, OF CLEVELAND, OHIO, A CORPORATION OF OHIO.

CAR-COUPLING.

1,363,479. Specification of Letters Patent. Patented Dec. 28, 1920.

Application filed May 4, 1918. Serial No. 232,447.

*To all whom it may concern:*

Be it known that I, WILLIAM J. METZGER, a citizen of the United States, residing at Cleveland, Cuyahoga county, Ohio, have invented new and useful Improvements in Car-Couplings, of which the following is a specification, reference being had to the accompanying drawings, in which—

Figure 1 is a vertical longitudinal section of a car coupler embodying my invention with the parts in locked position; Fig. 2 is a section similar to Fig. 1, but with the parts in knuckle thrown position; Fig. 3 is a section on lines 3—3 of Fig. 1, showing the actuating lever; Fig. 4 is a rear elevation of the actuating lever; Fig. 5 is a detail showing the manner of attaching the lever to the coupler head; and Fig. 6 is a section on lines 6—6 of Fig. 1.

My invention relates to car couplers of the same general type as that shown in Letters Patent to Arthur J. Bazeley, No. 1,144,315, dated June 22, 1915, and provides novel means for operating couplers of that type. My invention also relates to the various parts which I shall hereinafter describe and claim.

Referring to the drawings, A indicates the coupler head, B the knuckle, C the lock, D the knuckle thrower, E the actuating lever and F the link connecting the lever E and the lock C. The lever E has a horizontal portion having trunnion bearings 2 thereon, by which it is supported upon hooked shaped lugs 3 on the under side of the coupler head to the rear of the lock hole.

Each end of the horizontal portion of the lever is provided with an aperture 4 for insertion of the end of an uncoupling rod 5 by which the operation of the coupler may be effected. The lever E has a downward and forward extension 6 from the horizontal portion and is pivoted at 7 to the lower end of the link F. The lever E is provided with a projection 8, which, by reason of its entry into the recess 9 in the under side of the coupler head, serves to hold the lever in position when it has been connected with the other operating parts of the coupler.

The lower end of the link F is slotted to take about the end of the extension 6 of the lever E, which is pivoted thereto at 7. The upper end of the link has a horizontal projection 10 which seats in the inclined slot 11 in the lower end of the lock C. In assembling the mechanism, the knuckle is removed and the lock C is dropped down upon the floor of the coupler head with its leg projecting sufficiently below the coupler head so that the projection 10 of the link F may be inserted in the slot 11 in the lower end of the lock. The lever E, to which the link F has been attached, is next slipped into position with its trunnion bearings 2 in the lugs 3. The lock is then raised into locked position, seating on the knuckle thrower D, as is shown in Fig. 1. The raising of the lock in assembling the parts causes the rotation of the lever E so that the projection 8 on the head of the lever enters the recess and, by its bearing in the recess, prevents the removal of the lever from the supporting lugs 3.

The mechanism is operated by rotation of the uncoupling rod 5 which causes the lever E to swing forwardly and upwardly, lifting the link F and causing it to slide rearwardly and upwardly to the extent allowed by the inclined slot 11 in the leg of the lock and out from under the anti-creep shelf 12. Further movement of the lever E will lift the lock C and drive its leg rearwardly and upwardly against the thrower D, thereby exerting almost the entire rotating force of the uncoupling rod and lever E against the thrower. This movement is also assisted by the fulcruming action of the lock against the forward face 13 of the coupler cavity.

I have found the construction which I have described to be very efficient in operation and one in which the operating parts are arranged below the coupler head in such manner as to be completely accessible and with a minimum of interference to the other parts mounted on the car.

The terms and expressions which I have employed are used as terms of description and not of limitation, and I have no intention in the use of such terms and expressions, of excluding any mechanical equivalent for the features shown and described, but recognize that various structural modifications are possible within the scope of the invention claimed.

What I claim is:

1. In coupler operating mechanism, a vertically movable lock, a lever supported in open bearings beneath the coupler head to the rear of the lock hole, an arm on the lever connected to the leg of the lock by a link, a slot and projection engagement between coupler head and lever adapted to prevent disengagement of the lever from the coupler head when in operative position.

2. In coupler operating mechanism, a vertically movable lock, a lever arranged transversely of the coupler head, hook shaped lugs on the under side of the coupler head supporting said lever, means for connecting the lever and lock, and a bearing on the coupler head coöperating with a projection on the lever to prevent removal of the lever when in operative position.

3. In coupler operating mechanism, a knuckle, a vertically movable and tilting lock having a depending leg, a knuckle thrower intended to be operated by the rearward movement of said depending leg, a lever mounted on the coupler beneath said lock and rearwardly thereof and movable with the coupler, and a link connecting said lever and lock leg, said link and lock being lifted bodily by the lever to free said knuckle, the link upon further movement of the lever tipping rearwardly toward the knuckle thrower, and being moved substantially bodily to the rear to force the lock leg against said knuckle thrower.

4. In coupler operating mechanism, a lever arranged transversely of the coupler head and supported in bearings beneath the coupler head to the rear of the lock hole, a slot and projection engagement between coupler head and lever adapted to prevent disengagement of the lever from the coupler head when in operative position, and a vertically movable lock actuated by said lever through a connection with the leg of said lock.

WILLIAM J. METZGER.